(12) United States Patent
Chen

(10) Patent No.: US 6,276,701 B1
(45) Date of Patent: Aug. 21, 2001

(54) SCOOTER HAVING A SAFETY FOLDING MECHANISM

(76) Inventor: Ching Chiuan Chen, 7F, No. 46, Pin Ho 10 Street, Chang Hua (TW), 500

(*) Notice: Subject to any disclaimer, the term of this patent is extended or adjusted under 35 U.S.C. 154(b) by 0 days.

(21) Appl. No.: 09/597,808

(22) Filed: Jun. 19, 2000

(51) Int. Cl.[7] ........................................ B62M 1/00
(52) U.S. Cl. .............................................. 280/87.05
(58) Field of Search ........................ 280/87.01, 87.021, 280/87.041, 87.05, 639, 641, 63, 200, 263, 270

(56) References Cited

U.S. PATENT DOCUMENTS

| | | | |
|---|---|---|---|
| 1,664,858 | 4/1928 | Headley . | |
| 6,193,248 | * 2/2001 | Liu | 280/87.041 |
| 6,206,387 | * 3/2001 | Tsai | 280/87.041 |
| 6,234,501 | * 5/2001 | Chen | 280/87.041 |

* cited by examiner

Primary Examiner—Kevin Hurley

(57) ABSTRACT

A scooter includes a base having a rear wheel and having a block secured to the front portion. A tube is rotatably engaged on a handlebar and includes an arm pivotally secured to the block and having one or more oblong holes for slidably receiving a rod. A spring may bias the rod to engage with a groove of the block and to secure the handlebar to the base at an open working position. The rod may be moved along a curved surface of the block and may be forced to engage with the other groove of the block for securing the handlebar to the base at a folding position.

8 Claims, 3 Drawing Sheets

SCOOTER HAVING A SAFETY FOLDING MECHANISM

BACKGROUND OF THE INVENTION

1. Field of the Invention

The present invention relates to a scooter, and more particularly to a scooter having a safety folding mechanism.

2. Description of the Prior Art

Various kinds of scooters have been developed and include a foldable mechanism for folding the scooter to the compact folding and storing structure. U.S. Pat. No. 1,664,858 to Headley discloses one of the typical folding mechanisms for the typical scooters. However, the folding mechanism may be folded to the compact folding structure inadvertently when the actuating lever or the actuating ears are inadvertently kicked or depressed by the users, particularly the children.

The present invention has arisen to mitigate and/or obviate the afore-described disadvantages of the conventional scooters.

SUMMARY OF THE INVENTION

The primary objective of the present invention is to provide a scooter including a safety and solid folding mechanism for solidly retaining the scooter in the open or working position and for preventing the scooter from being folded to the compact folding structure inadvertently.

In accordance with one aspect of the invention, there is provided a scooter comprising a base including a rear portion having at least one wheel attached thereto, and including a front portion, a block secured on the front portion of the base and including a first groove formed therein, a handlebar, a tube rotatably engaged on the handlebar, the tube including an arm extended therefrom and pivotally secured to the block at a pivot shaft, the arm including at least one oblong hole formed therein, a rod slidably received in the oblong hole of the arm and movable to engage with the first groove of the block, and means for biasing the rod to engage with and to engage into the first groove of the block and to secure the arm and the handlebar to the base at an open working position.

The arm includes a barrel provided thereon, the biasing means includes a post slidably received in the barrel and secured to the rod, and a spring engaged with the post for biasing the post and the rod to engage into the first groove of the block. The post includes a first end having a screw hole formed therein, the rod includes a fastener provided thereon and threaded with the screw hole of the post for securing the rod to the post.

The post includes a knob provided thereon for moving the post against the spring and for disengaging the rod from the first groove of the block. The arm includes a pair of panels parallel to each other, the panels each includes an oblong hole formed therein for slidably receiving the rod. The block further includes a second groove formed therein for receiving the rod when the rod is disengaged from the first groove of the block. The block includes a curved surface formed between the first groove and the second groove of the block for allowing the rod to be smoothly moved between the first groove and the second groove of the block. The first groove of the block is preferably parallel to the pivot shaft.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
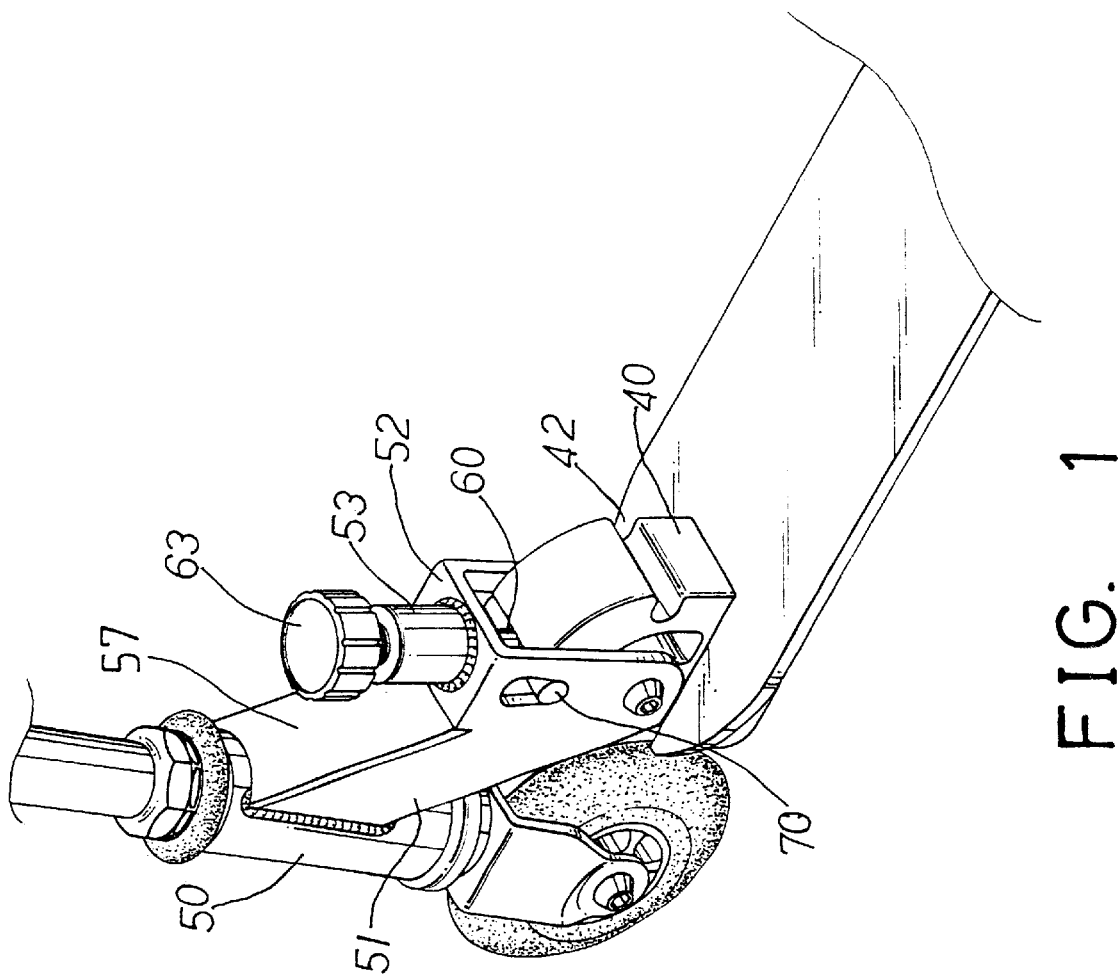
FIG. 1 is a partial perspective view of a scooter in accordance with the present invention.
Figure 2:
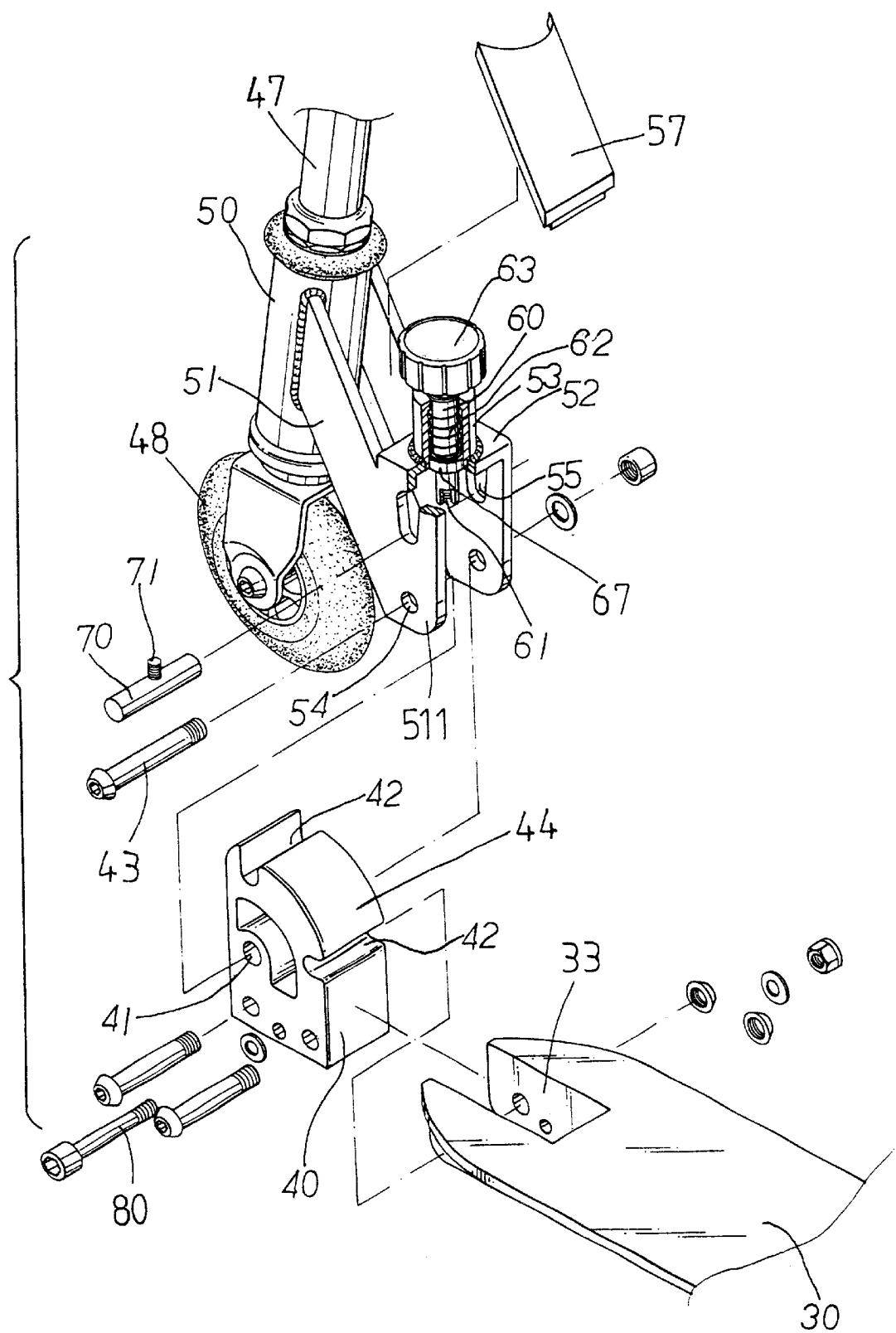
FIG. 2 is a partial exploded view of the scooter.
Figure 3:
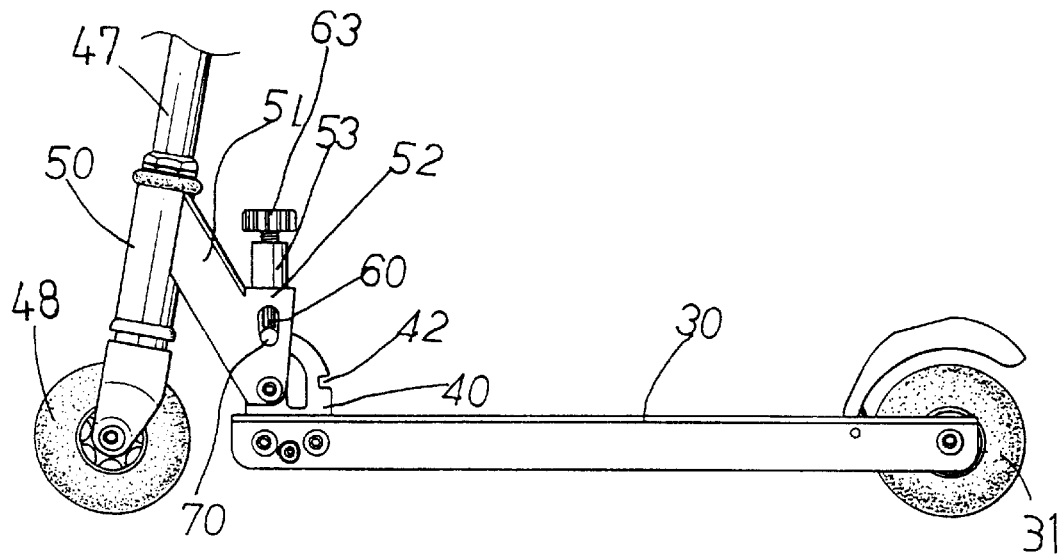
FIGS. 3 and 4 are partial side views illustrating the operation of the scooter.

Referring to the drawings, and initially to FIGS. 1–3, a scooter in accordance with the present invention comprises a base 30 including a rear portion having one or more wheels 31 attached thereto, and including a front portion having a recess 33 formed therein. A block 40 has a lower portion received in the recess 33 of the base 30 and secured to the base 30 with fasteners 80. The block 40 includes a hole 41 formed therein for receiving a pivot shaft 43, and includes two grooves 42 formed in the upper portion thereof and parallel to the pivot shaft 43, and includes a curved surface 44 formed between the grooves 42 and extended for about a quarter (¼) of a circle, and having a center of curvature located at the hole 41 and the pivot shaft 43. It is preferable that one of the grooves 42 of the block 40 is faced upward and the other groove 42 of the block 40 is faced rearward toward the rear portion of the base 30.

A pole or a handlebar 47 is rotatably secured or received in a tube 50 and has one or more wheels 48 attached to the bottom portion thereof and has a hand grip provided on top thereof. The handlebar 47 or the tube 50 includes an arm 51 extended rearward and downward therefrom and having one or more apertures 54 formed in the bottom thereof for receiving the pivot shaft 43 and for pivotally securing the tube 50 and thus the handlebar 47 to the block 40 and the base 30. The arm 51 preferably includes a pair of panels 511 parallel to each other, and preferably includes a pair of oblong holes 55 formed in the respective panels 511, and includes a table 52 formed above the oblong holes 55 of the arm 51. A cap 57 may be secured between the upper portions of the panels 511. A rod 70 is slidably received in the oblong holes 55 of the arm 51 and movable along the oblong holes 55 and movable up and down relative to the arm 51 or the handlebar 47. The rod 70 includes a fastener 71 secured thereof or extended therefrom. The arm 51 includes a barrel 53 provided on and preferably extended upward from the table 52.

A post 60 is slidably received in the barrel 53 and includes a screw hole 61 formed in the lower end thereof and threadedly engaged with the fastener 71 for securing the post 60 to the rod 70, such that the post 60 and the rod 70 moved in concert with each other and movable up and down along the barrel 53 and movable toward and away from the block 40. A knob 63 is secured to the upper portion of the post 60 and movable in concert with the post 60. The post 60 includes a peripheral flange 67 (FIG. 2) extended radially outward therefrom. A spring 62 is received between the post 60 and the barrel 53 and is engaged between the barrel 53 and the peripheral flange 67 of the post 60 for biasing the post 60 and thus the rod 70 downward to engage with the curved surface 44 and to engage with either of the grooves 42 of the block 40. The rod 70 may be easily moved between the grooves 42 of the block 40 along the curved surface 44 of the block 40.

Figure 4:
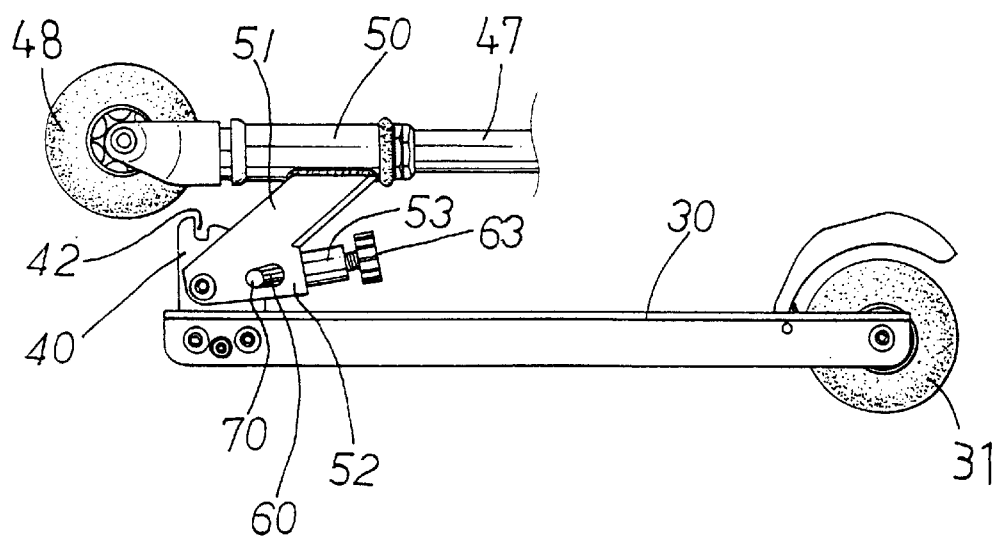

In operation, as shown in FIG. 3, when the handlebar 47 and the tube 50 and the arm 51 are rotated, about the pivot shaft 43, relative to and rotated away from the base 30 and the block 40 to the open or working position, the rod 70 may be biased to engage with the groove 42 of the block 40 that faces upward relative to the base 30. The rod 70 may not be easily disengaged from the groove 42 of the block 40 such that the handlebar 47 will not be easily folded toward the base 30 inadvertently by the children. The rod 70 and the post 60 may be pulled away from the block 40 against the spring 62 by pulling the knob 63, such that the rod 70 may be disengaged from the groove 42 of the block 40 and may be biased to engage with the curved surface 44 of the block 40, and may be biased to engage with the other groove 42 of the block 40 that faces rearward toward the rear portion of the base 30, as shown in FIG. 4. At this moment, the handlebar 47 is folded toward or to engage with the base 30 and is folded to the compact folding or storing configuration.

It is to be noted that the engagement of the rod 70 in either of the grooves 42 of the block 40 may further stably secure the arm 51 to the block 40 and may increase the anti-distortion of the arm 51 or may prevent the arm 51 from being easily distorted relative to the block 40.

Accordingly, the scooter in accordance with the present invention includes a safety and solid folding mechanism for solidly retaining the scooter in the open or working position and for preventing the scooter from being folded to the compact folding structure inadvertently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A scooter comprising:
   a base including a rear portion having at least one wheel attached thereto, and including a front portion,
   a block secured on said front portion of said base and including a first groove formed therein,
   a handlebar,
   a tube rotatably engaged on said handlebar, said tube including an arm extended therefrom and pivotally secured to said block at a pivot shaft, said arm including at least one oblong hole formed therein,
   a rod slidably received in said at least one oblong hole of said arm and movable to engage with said first groove of said block, and
   means for biasing said rod to engage with and to engage into said first groove of said block and to secure said arm and said handlebar to said base at an open working position.

2. The scooter according to claim 1, wherein said arm includes a barrel provided thereon, said biasing means includes a post slidably received in said barrel and secured to said rod, and a spring engaged with said post for biasing said post and said rod to engage into said first groove of said block.

3. The scooter according to claim 2, wherein said post includes a first end having a screw hole formed therein, said rod includes a fastener provided thereon and threaded with said screw hole of said post for securing said rod to said post.

4. The scooter according to claim 2, wherein said post includes a first end having a knob provided thereon for moving said post against said spring and for disengaging said rod from said first groove of said block.

5. The scooter according to claim 1, wherein said arm includes a pair of panels parallel to each other, said panels each includes an oblong hole formed therein for slidably receiving said rod.

6. The scooter according to claim 1, wherein said block further includes a second groove formed therein for receiving said rod when said rod is disengaged from said first groove of said block.

7. The scooter according to claim 6, wherein said block includes a curved surface formed between said first groove and said second groove of said block for allowing said rod to be smoothly moved between said first groove and said second groove of said block.

8. The scooter according to claim 1, wherein said first groove of said block is parallel to said pivot shaft.

* * * * *